(12) United States Patent
Nagata et al.

(10) Patent No.: US 8,032,253 B2
(45) Date of Patent: Oct. 4, 2011

(54) AUTOMATIC MACHINE SYSTEM AND WIRELESS COMMUNICATION METHOD THEREOF

(75) Inventors: Hideo Nagata, Kitakyushu (JP); Michiharu Tanaka, Kitakyushu (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 938 days.

(21) Appl. No.: 11/909,041

(22) PCT Filed: Feb. 15, 2006

(86) PCT No.: PCT/JP2006/302598
§ 371 (c)(1),
(2), (4) Date: Sep. 18, 2007

(87) PCT Pub. No.: WO2006/103838
PCT Pub. Date: Oct. 5, 2006

(65) Prior Publication Data
US 2009/0030550 A1     Jan. 29, 2009

(30) Foreign Application Priority Data
Mar. 25, 2005   (JP) ................................ 2005-087666

(51) Int. Cl.
*G05B 19/18*     (2006.01)
(52) U.S. Cl. ............ 700/251; 700/61; 700/83; 700/245; 700/250; 700/255; 340/10.1; 340/10.5; 340/10.51; 340/10.52; 340/10.42; 318/568.11; 318/568.13; 318/568.15; 318/568.2; 318/567; 901/3; 901/4; 901/6; 901/8; 901/9; 180/2.1; 701/207
(58) Field of Classification Search ............ 700/61, 700/83, 245, 250, 255, 260; 340/10.1, 10.5, 340/10.51, 10.52, 10.42, 5.6; 318/568.11, 568.13, 568.15, 568.2, 567, 569; 901/3, 4, 6, 8, 9, 46; 180/2.1; 701/207
See application file for complete search history.

(56) References Cited

U.S. PATENT DOCUMENTS
6,049,310 A * 4/2000 Sadahiro ...................... 343/702
(Continued)

FOREIGN PATENT DOCUMENTS
JP              04-196648 A       7/1992
(Continued)

OTHER PUBLICATIONS

Japanese Office Action, dated Jun. 17, 2011, issued in Application No. 2007-510333.

*Primary Examiner* — James P Trammell
*Assistant Examiner* — McDieunel Marc
(74) *Attorney, Agent, or Firm* — Sughrue Mion, PLLC

(57) ABSTRACT

In an automatic machine system comprising a mechanism unit (1) including at least one driving mechanism, a controller (2) for controlling a driving operation of the mechanism unit (1), and a teaching unit (3) for operating the mechanism unit (1), the teaching unit (3) includes a teaching unit communicating portion for carrying out a wireless communication with the controller (2) and a first field intensity monitoring portion (13) for monitoring a field intensity of communication data in the teaching unit communicating portion, and the controller (2) includes a controller communicating portion for carrying out a wireless communication with the teaching unit (3), a second field intensity monitoring portion (26) for monitoring a field intensity of communication data in the controller communicating portion, and a driving portion for driving the mechanism unit (1) based on an operation signal sent from the teaching unit (3) in the controller communicating portion.

18 Claims, 8 Drawing Sheets

U.S. PATENT DOCUMENTS

| | | | |
|---|---|---|---|
| 6,236,846 B1 * | 5/2001 | Uchimura et al. | 455/312 |
| 6,484,032 B1 * | 11/2002 | Okada | 455/456.1 |
| 6,625,446 B1 * | 9/2003 | Mochizuki | 455/421 |
| 6,678,532 B1 * | 1/2004 | Mizoguchi | 455/550.1 |
| 6,760,789 B2 * | 7/2004 | Fujita et al. | 710/22 |
| 7,519,811 B1 * | 4/2009 | Hara | 713/151 |
| 7,577,497 B2 * | 8/2009 | Johannessen et al. | 700/245 |
| 7,590,558 B2 * | 9/2009 | Chinnappan et al. | 705/26 |
| 7,650,205 B2 * | 1/2010 | Calcagno | 700/264 |
| 7,933,667 B2 * | 4/2011 | Sjoberg et al. | 700/82 |
| 2004/0260426 A1 * | 12/2004 | Johannessen et al. | 700/245 |
| 2005/0176432 A1 * | 8/2005 | Kamura et al. | 455/436 |
| 2005/0187657 A1 * | 8/2005 | Hashimoto et al. | 700/245 |
| 2010/0017033 A1 * | 1/2010 | Boca | 700/258 |
| 2010/0106299 A1 * | 4/2010 | Nagata | 700/264 |

FOREIGN PATENT DOCUMENTS

| | | |
|---|---|---|
| JP | 7-195285 A | 8/1995 |
| JP | 2000-280193 A | 10/2000 |
| JP | 2003-037749 A | 2/2003 |
| JP | 2004-133857 A | 4/2004 |
| JP | 2004-148488 A | 5/2004 |
| JP | 2004-299033 A | 10/2004 |
| JP | 2004-314255 A | 11/2004 |

* cited by examiner

AUTOMATIC MACHINE SYSTEM AND WIRELESS COMMUNICATION METHOD THEREOF

TECHNICAL FIELD

The present invention relates to an automatic machine system for connecting a controller and a teaching unit in an automatic machine through a wireless communication, and a wireless communication method thereof.

BACKGROUND ART

A system for controlling an automatic machine, a motor and an industrial robot has a control unit for controlling operations of the automatic machine, the motor and the robot, and furthermore, has a portable teaching operation unit carried by an operator in a teaching work (which is also referred to as a pendant). For an information transmission of the teaching unit and the control unit, conventionally, a twisted pair wire or an optical fiber has been used as a signal transmission path and a composite cable including a power supply wire to the teaching operation unit (which will be hereinafter referred to as a cable) has been utilized.

As an example, FIG. 7 is a view showing a structure of a conventional robot system described in Patent Document 1. In the drawing, 101 denotes a robot, 102 denotes a control unit for controlling an operation of the robot 101, 103 denotes a portable teaching operation unit, and 104 denotes a cable for transmitting information such as an operation button and an emergency stop between the control unit 102 and the portable teaching operation unit 103. FIG. 8 is a view showing the details of the portable teaching operation unit 103. In the drawing, 105 denotes a housing taking an almost T shape and 106 denotes a hand portion to be gripped by the operator. An operation surface of the housing 105 is provided with a keyboard (or a key sheet) 107 to be operated in the teaching work, an LCD display 108 for displaying various information such as teaching data and a robot position, and an emergency stop switch 109 (corresponding to emergency stopping unit). Moreover, one end of the cable 104 is connected to the housing 105.

When the operator presses down the emergency stop switch 109, emergency stop information is transmitted to the control unit 102 through the cable 104 so that the control unit 102 blocks the supply of power to drive motors (not shown) of the robot 101 and applies a brake (not shown) to each drive motor, thereby stopping the operation of the robot 101 forcibly. Consequently, it is possible to reliably stop the robot emergently with respect to an unintended operation at the worst.

In the conventional robot system described above, the operator is to perform the teaching work while dragging the cable when carrying the portable teaching operation unit 103. For this reason, there is a problem in that a great burden is imposed on the operator and operation flexibility in the teaching is also restricted. Therefore, it has been greatly desired that the cable 104 between the control unit 102 and the portable teaching operation unit 103 is caused to be wireless. For example, Patent Document 2 has described means for implementing an emergency stopping function in a robot system in which a portable teaching operation unit including an emergency stopping unit for blocking the supply of power to drive motors of a robot to bring the robot into an emergency stopping state is constituted to mutually carry out a communication by wireless with a control unit for controlling the robot.

Patent Document 1: JP-A-2000-280193 Publication (Page 7, FIGS. 1 and 2)
Patent Document 2: JP-A-2004-148488 Publication

DISCLOSURE OF THE INVENTION

Problems that the Invention is to Solve

In a system for connecting a controller and a portable teaching operation unit by wireless, however, the portable teaching operation unit is separated from the controller and gets out of an effective range of a wireless communication depending on a work in some cases, for example. In these cases, it is a matter of course that there are no means for transmitting an operation signal (a JOG operation for inducing a robot or a playback start and stop of the robot) of the portable teaching operation unit to the control unit. The operation also includes an emergency stopping operation. Even if the operator tries to block the supply of power to drive motors by pressing down the emergency stop switch of the portable teaching operation unit, the robot cannot be stopped. As a result, there is a possibility that the robot and peripheral apparatuses might be greatly damaged.

Also in the case in which a robot operation signal or emergency stop information is not transmitted to the controller due to a deterioration in the wireless communication state between the portable teaching operation unit and the controller, moreover, the robot stop signal and the emergency stop switch signal cannot be transmitted in the same manner. For this reason, there are problems in that the robot cannot be stopped and the robot and the peripheral apparatuses are greatly damaged.

In consideration of the drawbacks, it is an object of the invention to provide a safe automatic machine system by monitoring a field intensity of communication data of a wireless communication in a portable teaching operation unit which is caused to be wireless and giving an alarm to an operator or stopping an automatic machine in the case in which the portable teaching operation unit is not included in a radio operable range.

Means for Solving the Problems

In order to solve the problems, the invention has the following structure.

A first aspect of The invention is characterized by an automatic machine system comprising:
a mechanism unit including at least one driving mechanism;
a controller for controlling a driving operation of the mechanism unit; and
a teaching unit for operating the mechanism unit, wherein the teaching unit includes:
a teaching unit communicating portion for carrying out a wireless communication with the controller; and
a first field intensity monitoring portion for monitoring a field intensity of communication data in the teaching unit communicating portion and giving an alarm, and the controller includes:
a controller communicating portion for carrying out a wireless communication with the teaching unit through an antenna;
a second field intensity monitoring portion for monitoring the field intensity of communication data in the controller communicating portion and giving the alarm or a stop signal of the mechanism unit; and a driving portion for driving the mechanism unit based on an operation signal sent from the teaching unit which is received in the controller communicating portion.

A second aspect of the invention is characterized in that the first or second field intensity monitoring portion gives the alarm to an operator when the field intensity is equal to or smaller than a first threshold which is preset.

A third aspect of the invention is characterized in that the second field intensity monitoring portion gives the stop signal to the controller, thereby stopping the driving operation of the mechanism unit when the field intensity is equal to or smaller than a second threshold which is preset.

A fourth aspect of the invention is characterized in that the first or second field intensity monitoring portion gives the alarm to an operator when the field intensity is equal to or smaller than a first threshold which is preset, and the second field intensity monitoring portion gives the stop signal to the controller, thereby stopping the driving operation of the mechanism unit when the field intensity is equal to or smaller than a second threshold which is preset.

A fifth aspect of the invention is characterized in that the first or second field intensity monitoring portion monitors the field intensity every certain cycle, and gives an alarm to an operator when the field intensity is equal to or smaller than a preset first threshold continuously at a preset number of times.

A sixth aspect of the invention is characterized in that the preset thresholds of the field intensity are held as parameters in the teaching unit or the controller.

A seventh aspect of the invention is characterized in that the preset number of times is held as a parameter in the teaching unit or the controller.

An eighth aspect of the invention is characterized in that the alarm generated by the first field intensity monitoring portion is a display, a sound or a vibration, or a combination thereof.

A ninth aspect of the invention is characterized in that the alarm generated by the second field intensity monitoring portion is a display, a sound or an output to an external apparatus connected to the controller, or a combination thereof.

A tenth aspect of the invention is characterized in that the first field intensity monitoring portion generates a display, a sound or a vibration as the alarm and the second field intensity monitoring portion generates a display, a sound or an output to an external apparatus as the alarm when the driving operation of the mechanism unit is stopped.

An eleventh aspect of the invention is characterized in that a radio channel used in the wireless communication is released when the driving operation of the mechanism unit is stopped.

A twelfth aspect of the invention is characterized in that the second field intensity monitoring portion is disposed in the vicinity of an antenna of the controller communicating portion.

A thirteenth aspect of the invention is characterized by an automatic machine system comprising:

a mechanism unit including at least one driving mechanism;

a controller for controlling a driving operation of the mechanism unit; and a teaching unit for operating the mechanism unit, wherein the teaching unit includes:
a teaching unit communicating portion for carrying out a wireless communication with the controller; and
a first communication failure frequency monitoring portion for monitoring a communication failure frequency of the wireless communication in the teaching unit communicating portion and giving an alarm, and the controller includes:
a controller communicating portion for carrying out a wireless communication with the teaching unit through an antenna;
a second communication failure frequency monitoring portion for monitoring the communication failure frequency of the wireless communication in the controller communicating portion and giving the alarm or a stop signal of the mechanism unit; and
a driving portion for driving the mechanism unit based on an operation signal sent from the teaching unit which is received in the controller communicating portion.

A fourteenth aspect of the invention is characterized in that the first or second communication failure frequency monitoring portion gives the alarm to an operator when the communication failure frequency is equal to or greater than a third threshold which is preset.

A fifteenth aspect of the invention is characterized in that the second communication failure frequency monitoring portion gives the stop signal to the controller, thereby stopping the driving operation of the mechanism unit when the communication failure frequency is equal to or greater than a fourth threshold which is preset.

A sixteenth aspect of the invention is characterized in that the first or second communication failure frequency monitoring portion gives an alarm to an operator when the communication failure frequency is equal to or greater than a third threshold which is preset, and the second communication failure frequency monitoring portion give the stop signal to the controller, thereby stopping the driving operation of the mechanism unit when it is sensed that the communication failure frequency is equal to or greater than a fourth threshold which is preset.

A seventeenth aspect of the invention is characterized in that the first or second communication failure frequency monitoring portion monitors the communication failure frequency every certain cycle, and gives the alarm to an operator when the communication failure frequency is equal to or greater than a preset third threshold continuously at a preset number of times.

An eighteenth aspect of the invention is characterized in that the preset thresholds of the communication failure frequency are held as parameters in the teaching unit or the controller.

A nineteenth aspect of the invention is characterized in that the preset number of times is held as a parameter in the teaching unit or the controller.

A twentieth aspect of the invention is characterized in that the alarm generated by the first communication failure frequency monitoring portion is a display, a sound or a vibration, or a combination thereof.

A twenty-first aspect of the invention is characterized in that the alarm generated by the second communication failure frequency monitoring portion is a display, a sound or an output to an external apparatus connected to the controller, or a combination thereof.

A twenty-second aspect of the invention is characterized in that the first communication failure frequency monitoring portion generates a display, a sound or a vibration as the alarm and the second communication failure frequency monitoring portion generates a display, a sound or an output to an external apparatus as the alarm when the driving operation of the mechanism unit is stopped.

A twenty-third aspect of the invention is characterized in that a radio channel used in the wireless communication is released when the driving operation of the mechanism unit is stopped.

A twenty-fourth aspect of the invention is characterized in that the second communication failure frequency monitoring portion is disposed in the vicinity of the antenna of the controller communicating portion.

A twenty-fifth aspect of the invention is characterized by a wireless communication method of an automatic machine system comprising a controller for controlling a driving operation of a mechanism unit including at least one driving mechanism, and a teaching unit for operating the mechanism unit, wherein the teaching unit carries out a wireless communication with the controller to monitor a field intensity of communication data, and the controller carries out a wireless communication with the teaching unit to monitor the field intensity of communication data, and gives an alarm when the field intensity is equal to or smaller than a first threshold which is preset and stops the driving operation of the mechanism unit when the field intensity is equal to or smaller than a second threshold which is preset.

A twenty-sixth aspect of the invention is characterized by a wireless communication method of an automatic machine system comprising a controller for controlling a driving operation of a mechanism unit including at least one driving mechanism, and a teaching unit for operating the mechanism unit, wherein the teaching unit carries out a wireless communication with the controller to monitor a generation frequency of communication failure of communication data, and the controller carries out a wireless communication with the teaching unit to monitor the generation frequency of communication failure of communication data, and gives an alarm when the generation frequency of communication failure is equal to or greater than a third threshold which is preset and stops the driving operation of the mechanism unit when the generation frequency of communication failure is equal to or greater than a fourth threshold which is preset.

Advantage of the Invention

According to the first to fourth aspects of the invention, the field intensity of the communication data of the wireless communication can be monitored by the teaching unit and the controller respectively, and an alarm is given when the field intensity is equal to or smaller than the first threshold which is preset, and stops the driving operation of the mechanism unit when the field intensity is equal to or smaller than the second threshold which is preset. Therefore, there is an advantage that the portable teaching operation unit can be prevented from being operated by the operator at the outside of the operating range and a safety of an automatic machine can be enhanced.

According to the fifth aspect of the invention, the first or second field intensity monitoring portion gives the alarm when the field intensity is equal to or smaller than the preset first threshold continuously at the preset number of times. Consequently, there is an advantage that it is possible to prevent a false discrimination from being caused by only one accidental reduction in the field intensity.

According to the sixth and seventh aspects of the invention, the preset thresholds of the field intensity and the preset number of times are set to be the parameters in the first or second field intensity monitoring portion. Consequently, it is possible to produce an advantage that the operator can carry out a regulation depending on a wireless communication environment at the site.

According to the eighth to tenth aspects of the invention, the operator can recognize an abnormality by intuition, and furthermore, can utilize the invention for a situation management and maintenance of equipment using the automatic machine.

According to the eleventh aspect of the invention, by automatically releasing a radio channel in which a communication is established, it is possible to omit a procedure for releasing an establishing state with an original controller when carrying out a connection to the other controllers. Moreover, a radio channel which is stopped to be used by wireless can be made empty and used between the other controllers and the teaching unit. Therefore, it is also possible to obtain an advantage that a wireless communication having the number of channels limited can be utilized efficiently.

According to the twelfth aspect of the invention, the antenna of the controller communicating portion is disposed in the vicinity of the second field intensity monitoring portion. Also in the case in which only the antenna of the controller communicating portion is disposed apart from the controller, therefore, there is an advantage that it is possible to properly set a distance between the teaching unit and the second field intensity monitoring portion and to increase a distance between the controller and the teaching unit.

According to the thirteenth to sixteenth aspects of the invention, the communication failure generation frequency of the wireless communication can be monitored by the teaching unit and the controller respectively, and an alarm is given when the communication failure generation frequency is equal to or greater than the third threshold which is preset and the driving operation of the mechanism unit is stopped when the communication failure generation frequency is equal to or greater than the fourth threshold which is preset. Therefore, there is an advantage that the portable teaching operation unit can be prevented from being operated by the operator at the outside of the operating range and a safety of an automatic machine can be enhanced.

According to the seventeenth aspect of the invention, the first or second communication failure frequency monitoring portion gives the alarm when the communication failure frequency is equal to or greater than the preset third threshold continuously at the preset number of times. Consequently, it is possible to produce an advantage that a false discrimination can be prevented from being caused by only one accidental communication failure.

According to the eighteenth and nineteenth aspects of the invention, the preset thresholds of the communication failure frequency and the preset number of times are set to be the parameters in the first or second communication failure frequency monitoring portion. Consequently, it is possible to produce an advantage that the operator can carry out a regulation depending on the wireless communication environment at the site.

According to the twentieth to twenty-second aspects of the invention, the operator can recognize an abnormality by intuition, and furthermore, can utilize the invention for a situation management and maintenance of equipment using the automatic machine.

According to the twenty-third aspect of the invention, by automatically releasing a radio channel in which a communication is established, it is possible to omit a procedure for releasing an establishing state with an original controller when carrying out a connection to the other controllers. Moreover, a radio channel which is stopped to be used by wireless can be made empty and used between the other controllers and the teaching unit. Therefore, it is also possible to obtain an advantage that a wireless communication having the number of channels limited can be utilized efficiently.

According to the twenty-fourth aspect of the invention, the antenna of the controller communicating portion is disposed in the vicinity of the second communication failure frequency monitoring portion. Also in the case in which only the antenna of the controller communicating portion is disposed apart from the controller, therefore, there is an advantage that it is possible to properly set a distance between the teaching unit and the second communication failure frequency monitoring portion and to increase a distance between the controller and the teaching unit.

According to the twenty-fifth aspect of the invention, the field intensity of the communication data of the wireless communication is monitored by the teaching unit and the controller, respectively. Consequently, an alarm can be given when the field intensity is equal to or smaller than the first threshold which is preset, and the driving operation of the mechanism unit can be stopped when the field intensity is equal to or smaller than the second threshold which is preset. Therefore, there is an advantage that the operator can grasp the field intensity also in the wireless communication environment in which a communicating state is poor, and a safety of an automatic machine can be enhanced also in the case in which a fatal communication failure is generated.

According to the twenty-sixth aspect of the invention, the generation frequency of the communication failure of the wireless communication is monitored by the teaching unit and the controller, respectively. Consequently, an alarm can be given when the generation frequency is equal to or greater than the third threshold which is preset, and the driving operation of the mechanism unit can be stopped when the generation frequency is equal to or greater than the fourth threshold which is preset. Therefore, there is an advantage that the operator can grasp the communication failure frequency also in the wireless communication environment in which a communicating state is poor, and a safety of an automatic machine can be enhanced also in the case in which a fatal communication failure is generated.

Figure 1:
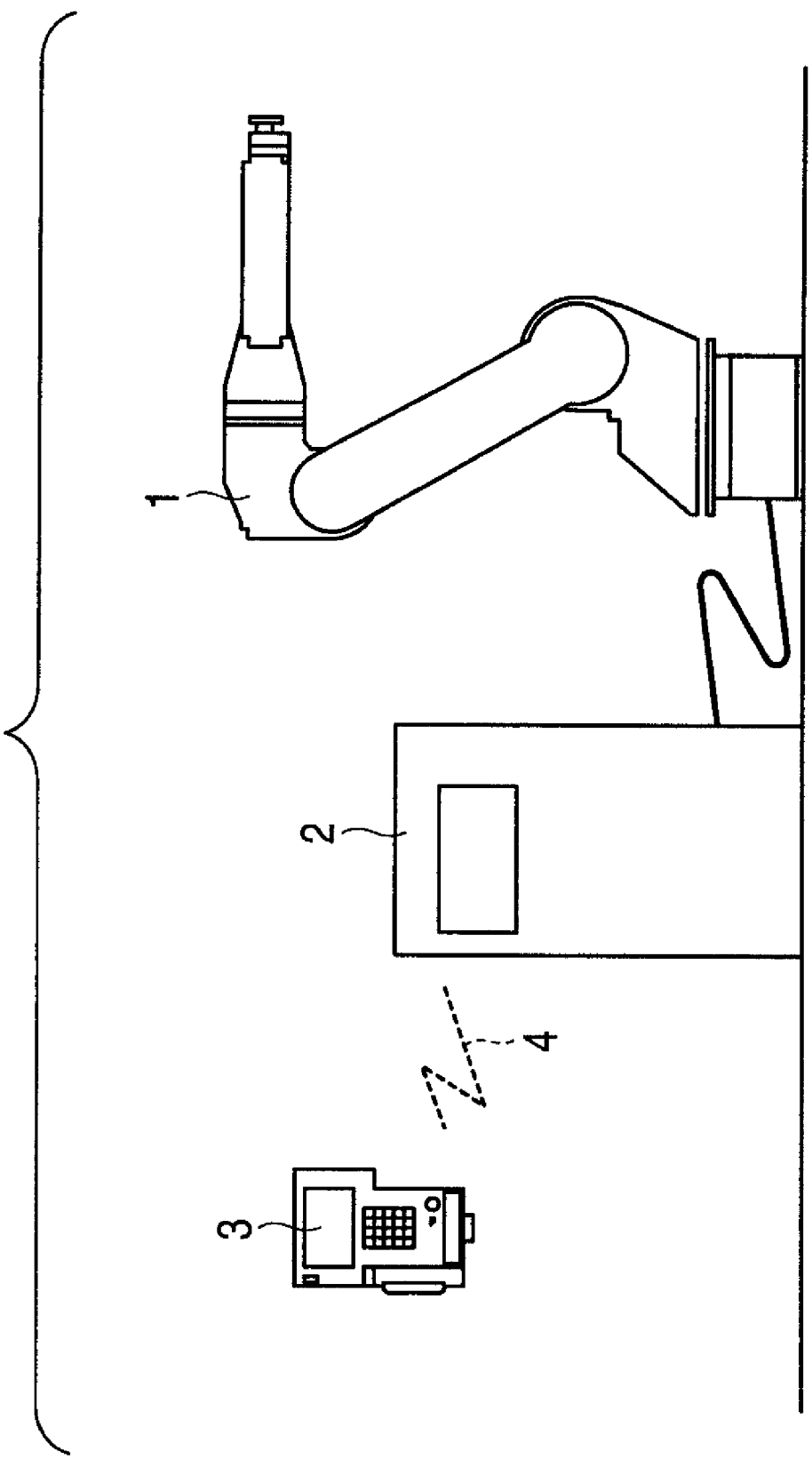
FIG. 1 is a view showing a structure of a robot system according to a first example of the invention.

EXPLANATION OF DESIGNATIONS 1 robot
2 controller
3 portable teaching operation unit
4 wireless communication
5 housing
6 hand portion
7 keyboard
8 LCD display
9 emergency stop switch
10 antenna
11 battery
12 power switch
13 first field intensity monitoring portion
14 first communication failure frequency monitoring portion
21 control unit
22 servo amplifiers
23 drive motors
24 antenna
25 LCD display
26 second field intensity monitoring portion
27 cable communication line
28 second communication failure frequency monitoring portion
101 robot
102 control unit
103 portable teaching operation unit
104 cable
105 housing
106 hand portion
107 keyboard
108 LCD display
109 emergency stop switch

BEST MODE FOR CARRYING OUT THE INVENTION

Specific examples of a method according to the invention will be described below with reference to the drawings.

First Example

FIG. 1 is a view showing a structure of an automatic machine (which is assumed to be a robot) system according to a first example of the invention. In the drawing, 1 denotes a robot, 2 denotes a controller for controlling an operation of the robot 1, 3 denotes a portable teaching operation unit, and 4 denotes a wireless communication for transmitting information about an operation button or an emergency stop between the controller 2 and the portable teaching operation unit 3 (the reference numeral 4 is typically shown).

Figure 2:
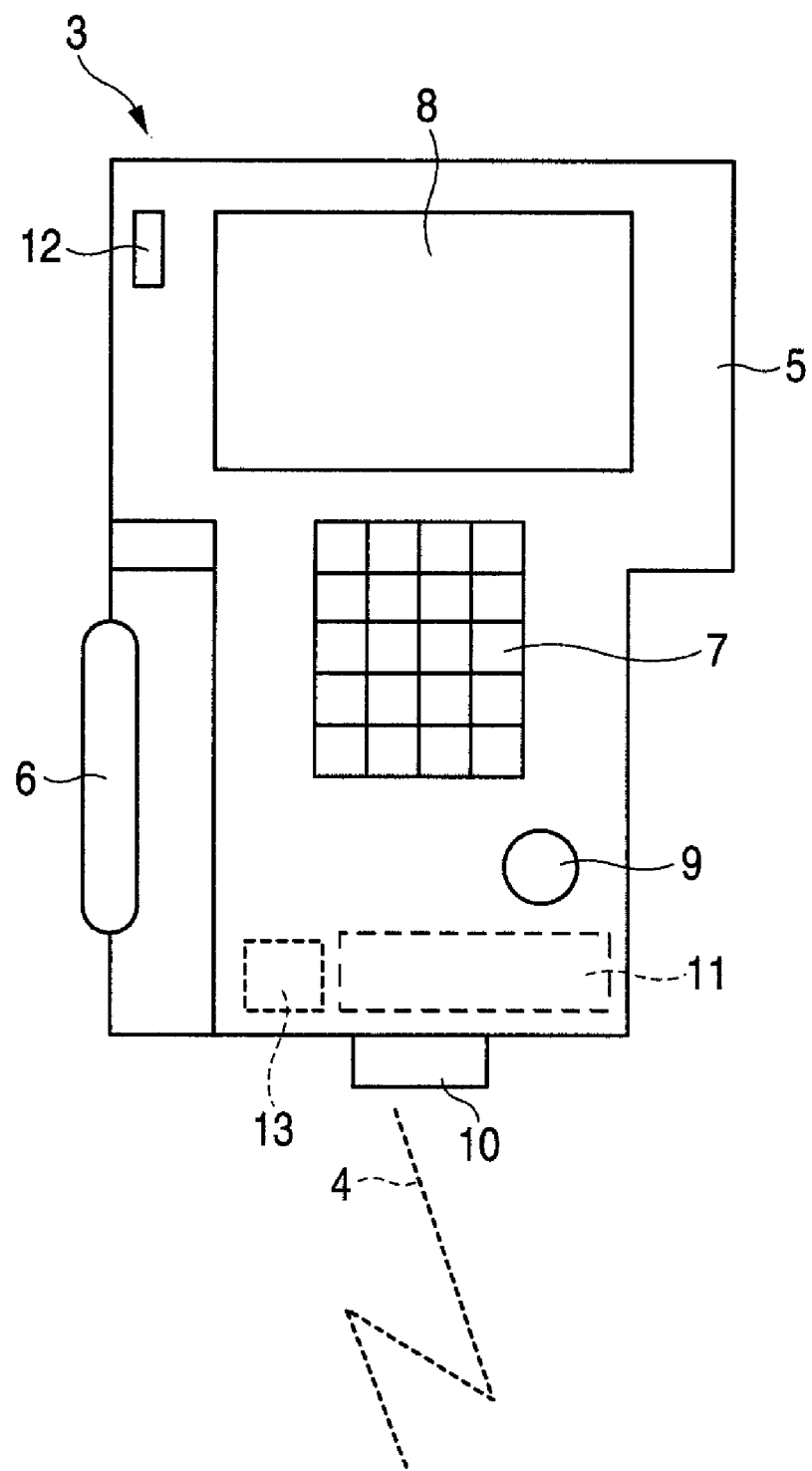
FIG. 2 is a view showing the details of a portable teaching operation unit according to the first example of the invention.

FIG. 2 is a view showing the details of the portable teaching operation unit 3. In the drawing, 5 denotes a housing taking an almost T shape and 6 denotes a hand portion to be gripped by an operator. An operation surface of the housing 5 is provided with a keyboard (or a key sheet) 7 to be operated by the operator in a teaching work, an LCD display 8 for displaying various information such as teaching data and a robot position, and an emergency stop switch 9 (corresponding to emergency stopping means). Moreover, the housing 5 is provided with an antenna 10 to be transmitting and receiving means of the wireless communication 4, a battery 11 for supplying a power independently of the controller 2, and a power switch 12 for starting/stopping the supply of the power.

Figure 3:
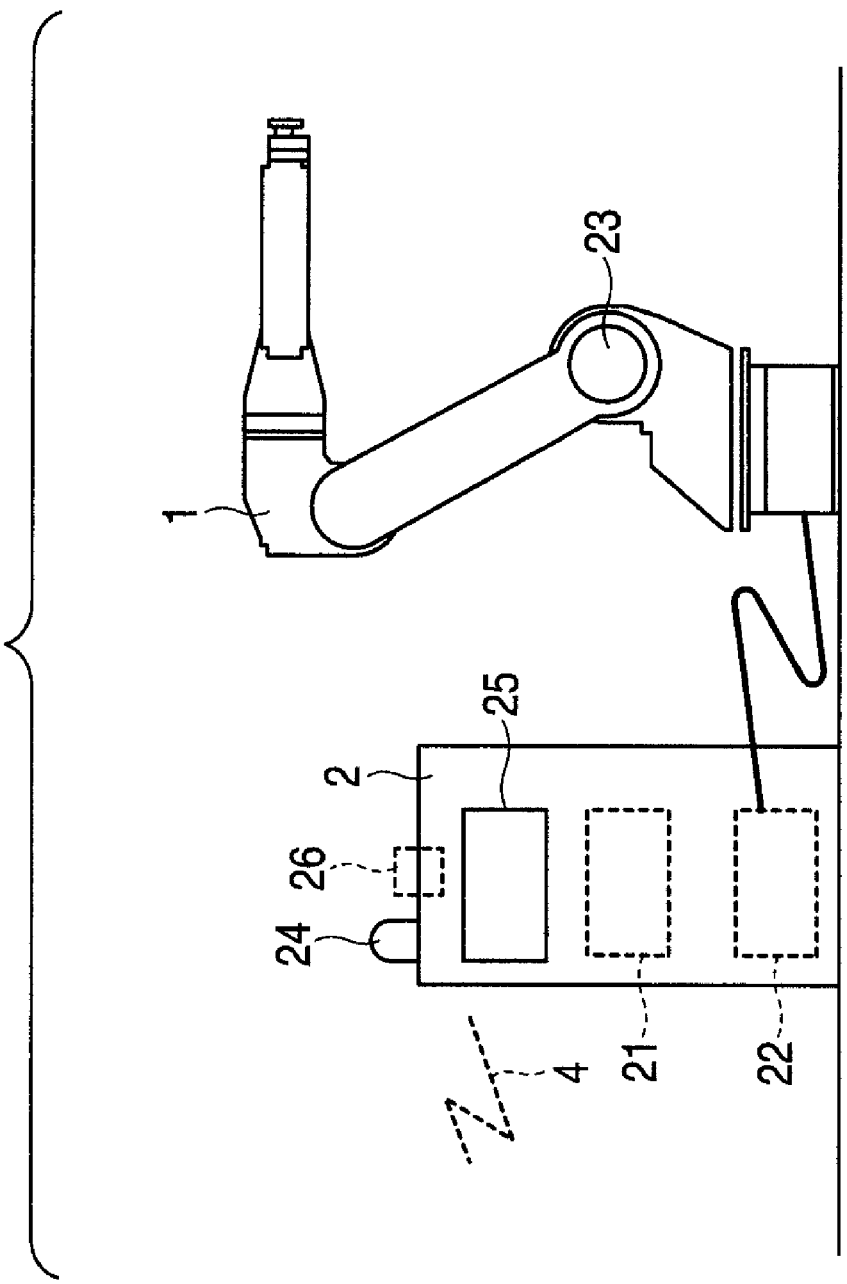
FIG. 3 is a view showing the details of the robot system according to the first example of the invention.

FIG. 3 is a view showing the details of the controller 2. In the drawing, 21 denotes a control unit for calculating current commands to be given to drive motors, 22 denotes servo amplifiers for driving drive motors in accordance with the current commands, 23 denotes drive motors attached to the robot 1, 24 denotes an antenna to be transmitting and receiving means of the wireless communication 4, and 25 denotes an LCD display for displaying an operating state of the robot and an alarm.

When the operator presses down an inducing operation button every shaft of the robot 1 which is assigned to the keyboard 7 of the portable teaching operation unit 3, shaft operation information is transmitted to the control unit 21 of the controller 2 through the wireless communication 4 so that the control unit 21 supplies a power to the drive motors 23 of the robot 1, thereby operating the robot 1.

When the operator presses down the emergency stop switch 9, moreover, emergency stop information is transmitted to the controller 2 through the wireless communication 4 so that the control unit 21 blocks the supply of the power to the drive motors 23 of the robot 1, thereby stopping the operation of the robot 1 forcibly. Consequently, the robot 1 is reliably stopped emergently with respect to an unintended operation at the worst.

In the invention, the portable teaching operation unit 3 and the controller 2 are newly provided with a first field intensity monitoring portion 13 for monitoring a field intensity of the communication data of the wireless communication 4 and a second field intensity monitoring portion 26 for monitoring a field intensity of the communication data of the wireless communication 4, respectively.

The first field intensity monitoring portion 13 and the second field intensity monitoring portion 26 have separate antennas from the antennas 10 and 24 respectively in order to prevent the monitoring of the field intensity from being disabled due to the failure of the antenna 10 or 24, and serve to measure a magnitude of a received signal with respect to the communication data of the wireless communication 4 which are received. In order to decrease devices to be loaded, alternatively, the first field intensity monitoring portion 13 may measure the field intensity of communication data received from the antenna 10 and the second field intensity monitoring portion 26 may measure the field intensity of communication data received from the antenna 24.

A mutual confirmation is always carried out through the wireless communication 4 between the portable teaching operation unit 3 and the controller 2. More specifically, the presence of a communication failure of the wireless communication 4, the presence of a failure of mutual internal processing circuits, and the presence of a failure of relay welding of an emergency stopping circuit in the controller 2 are checked in addition to the presence of an ON operation of the portable teaching operation unit 3. As a result of the mutual confirmation, in the case in which it is decided that the failure is not caused and both of them are operated normally, the robot 1 can be operated through the portable teaching operation unit 3.

According to the method, in the case in which the operator executes the teaching work or a playback operation in the vicinity of the robot 1, the first field intensity monitoring portion 13 of the portable teaching operation unit 3 monitors the field intensity of the communication data of the wireless communication 4 which are sent from the controller 2 and the second field intensity monitoring portion 26 of the controller 2 monitors the field intensity of the communication data of the wireless communication 4 which are sent from the portable teaching operation unit 3.

Figure 4:
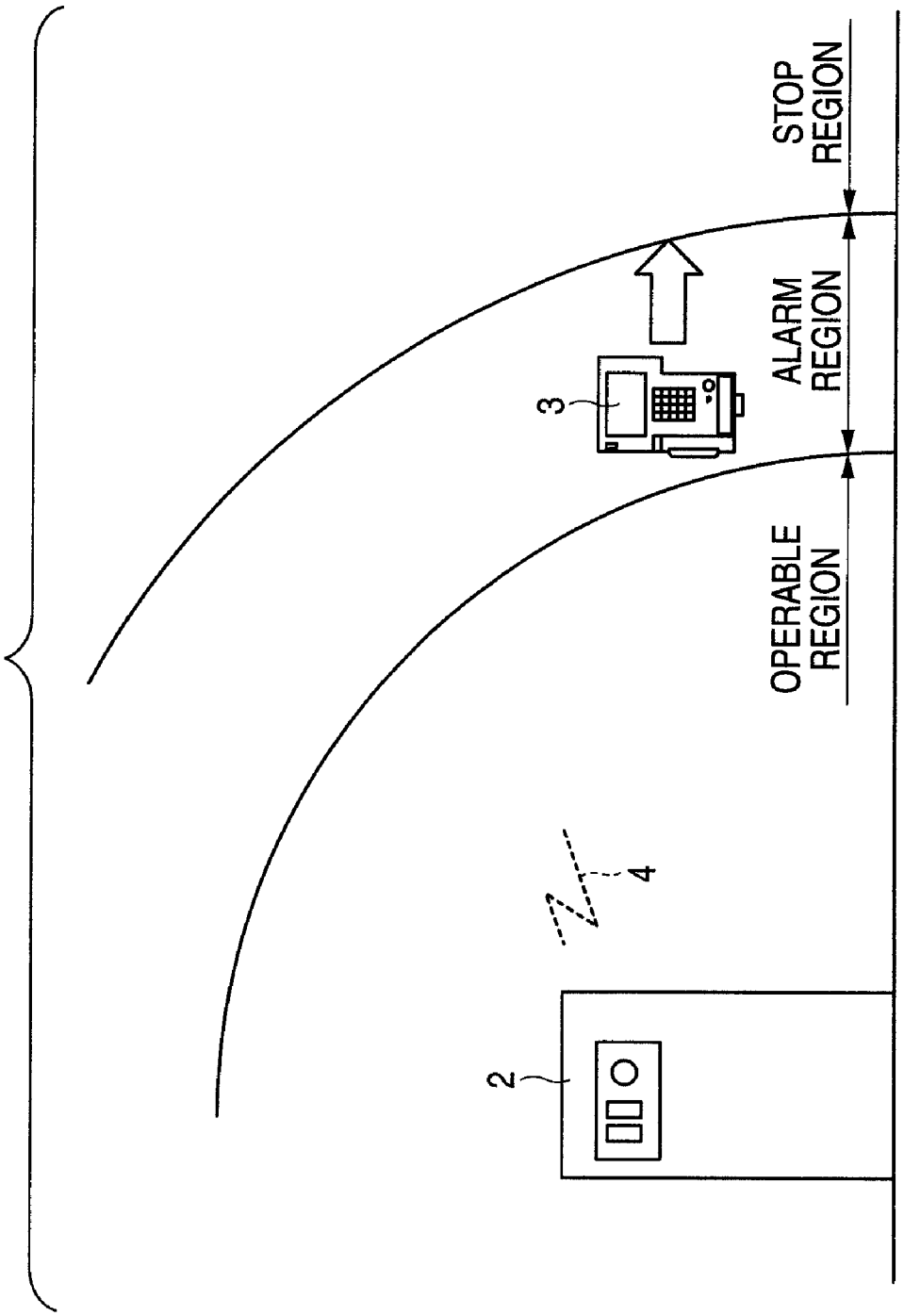
FIG. 4 is a view showing an operation of a robot system according to a second example of the invention.

As shown in FIG. 4, when the operator moves in such a direction as to separate from the controller 2 in order to carry out the confirmation of the operation of the robot 1 or other works, the field intensities monitored by the first field intensity monitoring portion 13 and the second field intensity monitoring portion 26 are reduced. For this reason, in the case in which the field intensities are equal to or smaller than a preset threshold A (A is a real number which is greater than zero), the purport that the communication failure of the wireless communication 4 might be generated by deciding that an alarm region is entered or the purport that the operator might get out of an operable region is displayed on the LCD display 8 of the portable teaching operation unit 3 and gives the alarm to the operator. Similarly, the purport that the communication failure of the wireless communication 4 might be generated or the purport that the operator might get out of the operable region is also displayed on the LCD display 25 of the controller 2.

A relationship between the field intensity and the threshold A may be displayed on the LCD display 8 of the portable teaching operation unit 3 or the LCD display 25 of the controller 2.

According to the method, it is possible to avoid a state in which the robot 1 is operated in a position placed out of the operable region through the wireless communication 4 and to avoid a state in which the robot 1 cannot be stopped due to the communication failure even if the emergency stop switch 9 is pressed down when the operation of the robot 1 is carried out abnormally.

Second Example

In the case in which the operator disregards the alarm displayed on the LCD display 8 of the portable teaching operation unit 3, and furthermore, gets out of the operable region of the wireless communication 4, the robot 1 is not under control of the operator. For this reason, it is necessary to block the supply of the power to the drive motors 23 of the robot 1 by an emergency stopping operation in order to prevent a danger. A second example according to the invention takes the fact into consideration.

As shown in FIG. 4, when the operator further moves in such a direction as to separate from the controller 2, the field intensities monitored by the first field intensity monitoring portion 13 and the second field intensity monitoring portion 26 are reduced to be equal to or smaller than a second threshold B which is preset (B is a real number which is greater than zero, and A>B is set). In this case, an intention of the operator is not transmitted to the controller 2 through the wireless communication 4 at all. Assuming that a stop region is entered, therefore, the second field intensity monitoring portion 26 issues an emergency stop processing to the controller 2 for a safety. Consequently, the controller 2 blocks the supply of the power to the drive motors 23 of the robot 1.

Moreover, the first field intensity monitoring portion 13 displays, on the LCD display 8 of the portable teaching operation unit 3, that the robot is stopped emergently.

In combination with the first example, moreover, it is also possible to employ a structure in which the alarm is given on the assumption that the alarm region is entered in the case in which the field intensity is equal to or smaller than the first threshold A which is preset, and the supply of the power to the drive motors 23 of the robot 1 is blocked for a safety on the assumption that the stop region is entered in the case in which the field intensity is equal to or smaller than the second threshold B which is preset.

In the case in which the operator approaches the controller 2 from the stop region again, furthermore, it is also possible to display, on the LCD display 8 of the portable teaching operation unit 3 or the LCD display 25 of the controller 2, the purport that the supply of the power of the robot 1 can be carried out from the controller 2 to the operator only in the case in which the field intensity of the wireless communication 4 is greater than the first threshold A or the second threshold B which is preset.

According to the method, it is possible to maintain a safety in a state in which the robot 1 is not under control of the operator by automatically blocking the supply of the power to the robot 1 to stop the robot 1 in the case in which the operator completely gets out of the operable region through the wireless communication 4.

Third Example

In order to enhance the operability of the operator, it is necessary to prevent a false discrimination when monitoring the field intensity of the wireless communication 4. A third example according to the invention deals with the problem.

In the case in which the field intensities monitored by the first field intensity monitoring portion 13 and the second field intensity monitoring portion 26 are reduced continuously with the passage of time, it is possible to prevent a false discrimination due to only one accidental reduction in the intensity and to reliably identify that a distance between the portable teaching operation unit 3 and the controller 2 is increased by deciding a change every preset time with respect to the field intensity. More specifically, in the case in which a state in which the field intensity of the wireless communication 4 is equal to or smaller than the preset threshold A is continuously brought at a preset number of times C (C is a natural number), the alarm is given to the operator from the portable teaching operation unit 3 and the controller 2 in the same manner as in the first example on the assumption that the operator separates from the controller 2.

It is assumed that the operator can input, as parameters, the threshold A, the threshold B and the number of times C according to the first example to the example from the portable teaching operation unit 3 and the controller 2, and they can be regulated depending on the wireless communication environment at the site.

According to the method, the field intensity is reduced continuously with the passage of time so that the false discrimination can be prevented from being caused by only one accidental reduction in the intensity.

Fourth Example

In the examples described above, the first field intensity monitoring portion 13 displays, as the alarm on the LCD display 8 of the portable teaching operation unit 3, the purport that the operator gets out of the operable region through the wireless communication 4. Although it is sufficient that the operator often turns his (her) eyes on the LCD display 8, there is also a possibility that he (she) might not turn his (her) eyes on the LCD display 8 for a long time. In this case, there is a problem in that the operator does not become aware of the alarm given to the LCD display 8 but gets out of the operable region. A fourth example according to the invention deals with the problem.

In the fourth example according to the invention, the alarm is given by auditory means such as a buzzer sound or a voice output, or a vibration of a vibrating motor as alarm means in addition to the display of the alarm on the LCD display 8 of the portable teaching operation unit 3. Furthermore, the alarm may be given in their combination.

According to the method, even if the operator does not often turn his (her) eyes on the LCD display 8, it is possible to reliably recognize the alarm indicating the purport that the operator gets out of the operable region through the wireless communication 4.

Fifth Example

There is a problem in that only an operator having the portable teaching operation unit 3 can recognize the alarm if the alarm is simply generated on the LCD display 8 of the portable teaching operation unit 3. A fifth example according to the invention deals with the problem.

An alarm or a stop display given by the second field intensity monitoring portion 26 in the controller 2 is output to auditory means such as a buzzer sound or a voice output, or an external apparatus in addition to the display on the LCD display 25.

The external apparatus implies a host system or a peripheral system which is connected through a network. By carrying out an output to the external apparatus, it is possible to transmit that the work of the robot 1 is interrupted to other controllers and the operators manipulating them.

While the fourth example and the examples are related to the alarm indicating the purport that the operator gets out of the operable region through the wireless communication 4, moreover, it is also possible to give the purport that the stop is carried out by auditory means such as a buzzer sound or a voice output or a vibration in the portable teaching operation unit 3, or auditory means such as a buzzer sound or a voice output in the controller 2 or an output to the external apparatus in the same manner as in the case in which the operator gets out of the operable region so that the robot is stopped automatically.

According to the method, people other than the operator having the portable teaching operation unit 3 can also recognize that the teaching work or the playback operation is stopped. Furthermore, the method can also be utilized for a situation management and maintenance of equipment using the robot.

Sixth Example

There is a problem in that an interference with other radio channels is generated or a resource of the interference is insufficient if a radio establishing state is not released when the operator carries the portable teaching operation unit 3 and gets out of the operable region through the wireless communication 4 in order to perform the teaching work of the robot 1. A sixth example according to the invention deals with the problem.

As described in the second example, the operator separates from the controller 2 so that the field intensities monitored by the first field intensity monitoring portion 13 and the second field intensity monitoring portion 26 are equal to or smaller than the second threshold B which is preset and the controller 2 blocks the supply of the power to the drive motors 23 of the robot 1. In that case, the communication establishing state of the radio channel in which the wireless communication is established is released automatically. More specifically, a command for releasing the communication establishing state of the wireless communication 4 is given from the first field intensity monitoring portion 13 and the second field intensity monitoring portion 26 to the portable teaching operation unit 3 and the controller 2 so that a transmitting and receiving communication is stopped.

In the case in which the operator is to establish the communication again, moreover, he (she) gets into the operable region to give a request for establishing the wireless communication from the portable teaching operation unit 3 to the controller 2, thereby establishing the wireless communication.

According to the method, the wireless communication establishing state is released when the operator gets out of the operable region through the wireless communication 4. Consequently, the establishing state can be released while data on the wireless communication are processed normally. In a connection to the other controllers, moreover, it is possible to omit a procedure for releasing the establishing state together with an original controller. Furthermore, a radio channel which is stopped to be used by wireless can be made empty and used between the other controllers and the portable teaching operation unit 3. Therefore, it is possible to efficiently utilize the wireless communication which has the number of channels limited.

Seventh Example

There is a problem in that the wireless communication cannot be used in the case in which the robot 1 is put in a distant place from the controller 2 on the outside of the operable region through the wireless communication 4. A seventh example according to the invention deals with the problem.

Figure 5:
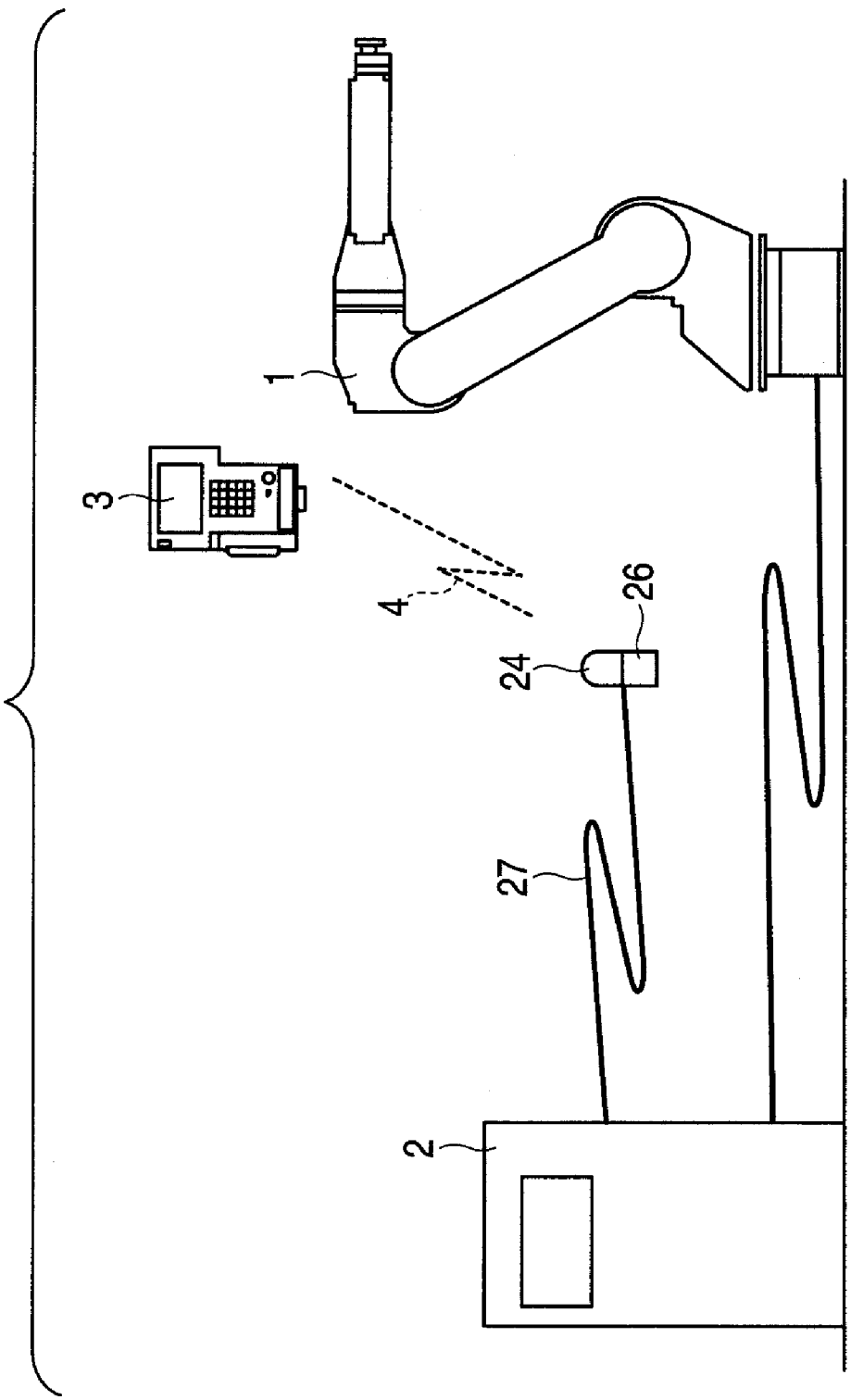
FIG. 5 is a view showing a structure of a robot system according to a seventh example of the invention.

As shown in FIG. 5, a communication line 27 is disposed from the controller 2 to the vicinity of the robot 1 and the antenna 24 of the controller communicating portion is disposed on a tip of the communication line 27. At the same time, the second field intensity monitoring portion 26 is also disposed in the vicinity of the antenna 24. Consequently, field intensity levels of the antenna 24 and the second field intensity monitoring portion 26 can be set to be equal to each other and the operable range of the wireless communication 4 can be set easily.

According to the method, the antenna of the controller communicating portion is disposed in the vicinity of the second field intensity monitoring portion 26. Also in the case in which only the antenna 24 of the controller communicating portion is disposed apart from the controller 2, consequently, a distance between the portable teaching operation unit 3 and the second field intensity monitoring portion can be set properly and a distance between the controller 2 and the portable teaching operation unit 3 can be increased.

Eighth Example

While the field intensity of the communication data of the wireless communication 4 are monitored in the examples described above, there is a problem in that the communication between the portable teaching operation unit 3 and the controller 2 cannot be established normally due to a communication failure caused by a co-channel interference also in the case in which the portable teaching operation unit 3 is provided in the operable region, and the operator does not recognize an abnormal communication so that the operation is disabled. An eighth example according to the invention deals with the problem.

Figure 6:
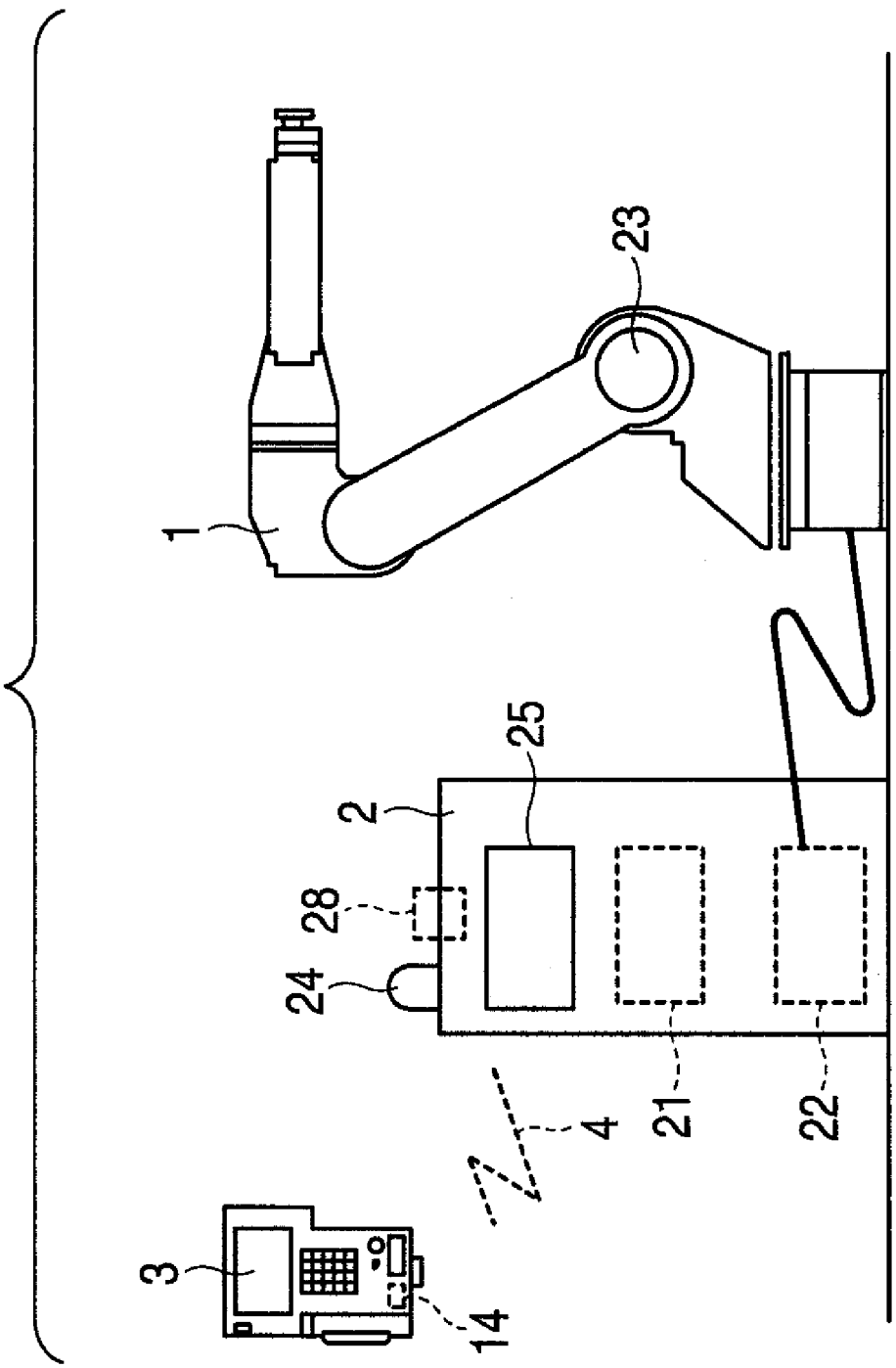
FIG. 6 is a view showing a structure of a robot system according to an eighth example of the invention.
Figure 7:
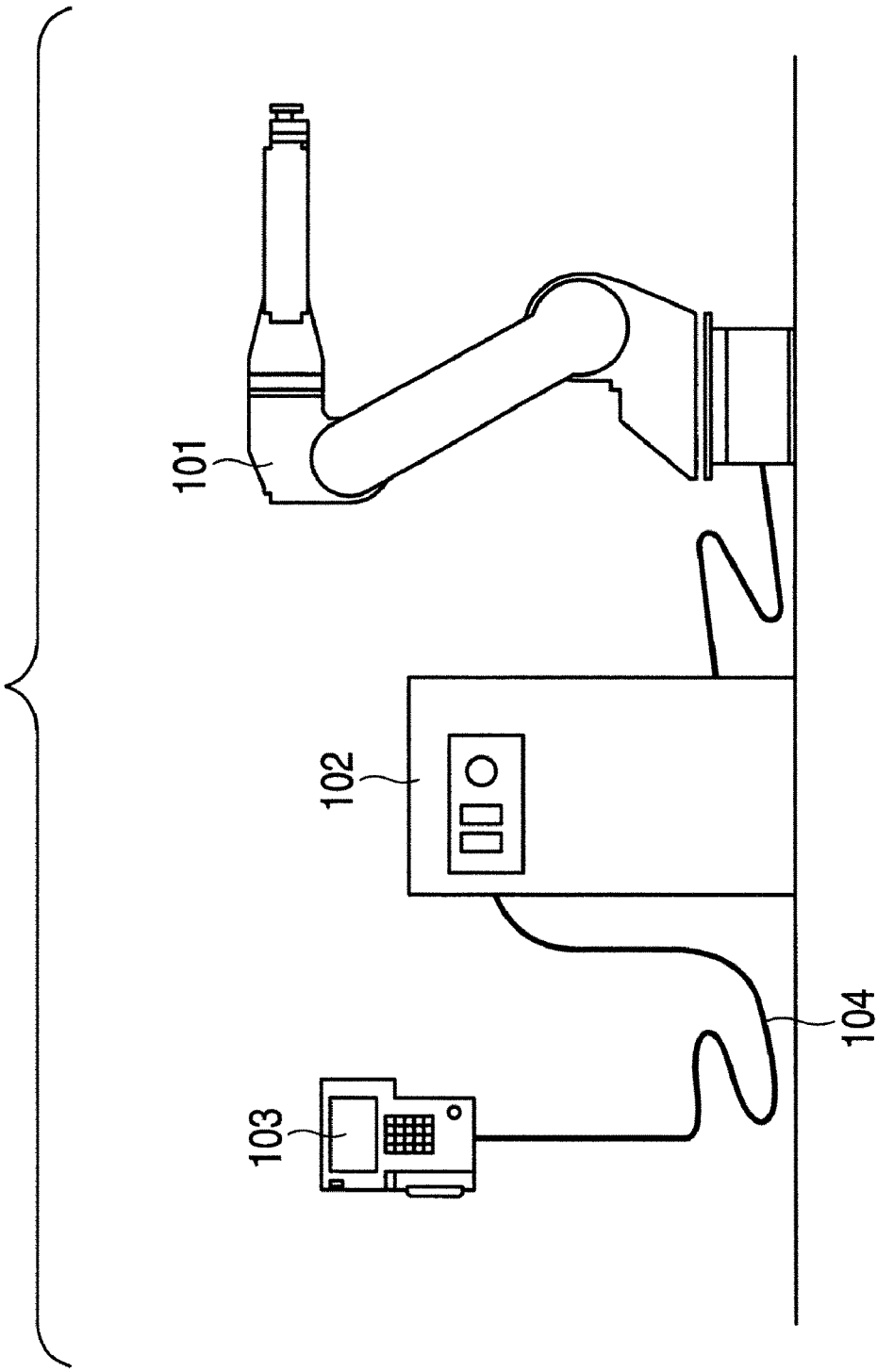
FIG. 7 is a view showing a structure of a conventional robot system.
Figure 8:
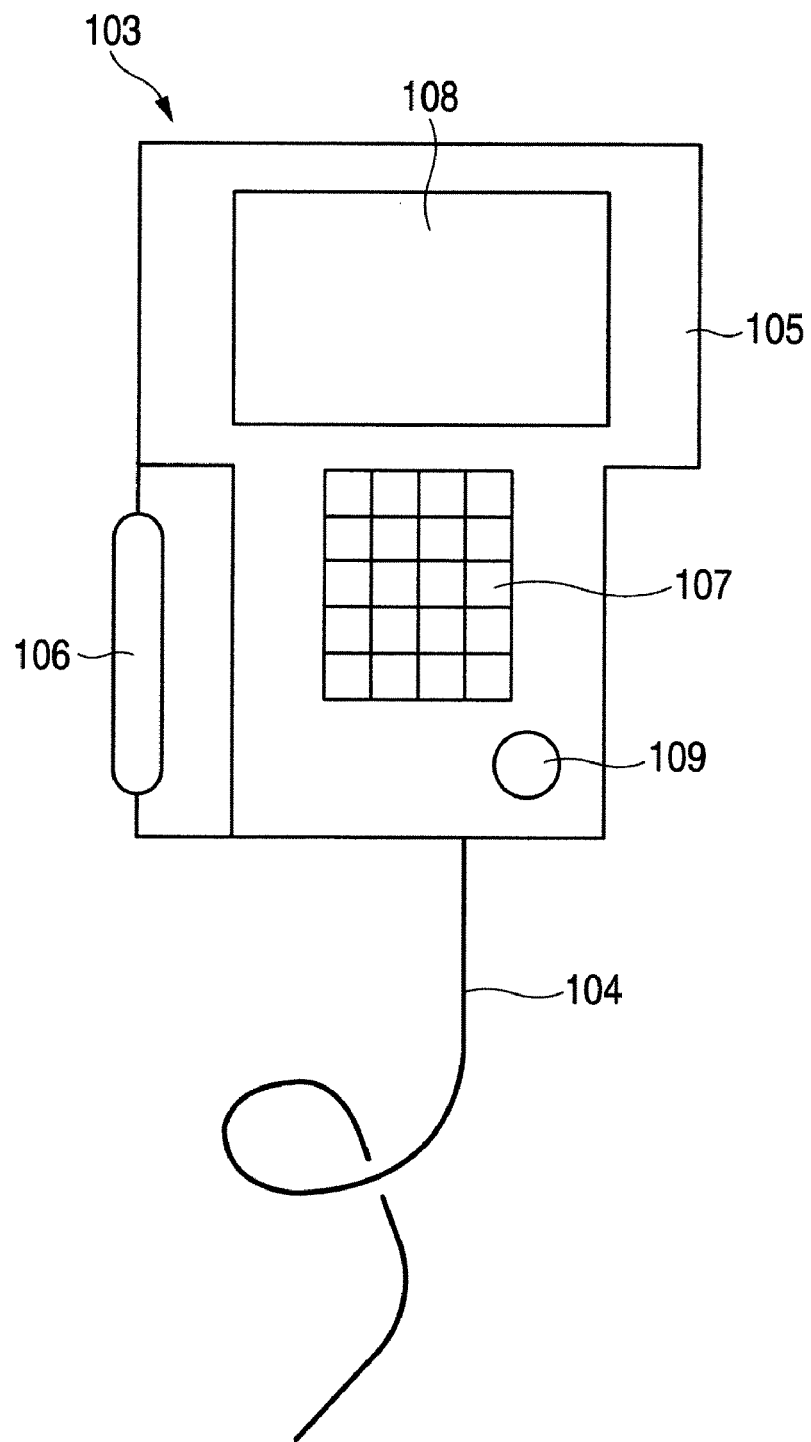
FIG. 8 is a view showing the details of a conventional portable teaching operation unit.

As shown in FIG. 6, the portable teaching operation unit 3 and the controller 2 are newly provided with a first communication failure frequency monitoring portion 14 for monitoring a frequency at which the communication failure of the communication data of the wireless communication 4 is generated and a second communication failure frequency monitoring portion 28 for monitoring a frequency at which the communication failure of the communication data of the wireless communication 4 is generated, respectively.

In the same manner as in the first example, the first communication failure frequency monitoring portion 14 and the second communication failure frequency monitoring portion 28 have separate antennas from the antenna 10 and the antenna 24 respectively in order to prevent the communication failure frequency from being unmonitored due to the failure of the antenna 10 or the antenna 24, and measure the frequency at which the communication failure is generated with respect to the communication data of the wireless communication 4 which are received. More specifically, the communication failure frequency is calculated by accumulating a time that the communication failure is generated in a preset time and obtaining a rate to a cycle.

In the same manner as in the second example, it is also possible to employ a structure in which the alarm is given if the communication failure frequency is equal to or greater than a third threshold D which is preset and the supply of the power to the drive motors 23 of the robot 1 is blocked for a safety if the communication failure frequency is equal to or greater than a fourth threshold E which is preset (D and E are real numbers which are greater than zero and D<E is set).

In that case, in the same manner as in the fourth and fifth examples, the alarm or the presentation is given by various means in the portable teaching operation unit 3 and the controller 2.

In the same manner as in the third example, by deciding a change every preset time with respect to the communication failure frequency, it is possible to prevent a false discrimination from being caused by only one accidental communication failure and to reliably decide an abnormality caused by an abnormal communication such as an interference or an abnormality caused by a great distance. More specifically, in the case in which the state in which the communication failure frequency is equal to or smaller than the preset threshold D is maintained continuously at a preset number of times F (F is a natural number), the alarm is given from the portable teaching operation unit 3 and the controller 2 to the operator in the same manner as in the first example on the assumption that a communication failure is generated.

In the same manner as in the sixth example, moreover, it is also possible to employ a structure in which the radio establishing state of the radio channel in which the communication is established by wireless is released when the driving operation of the robot 1 is stopped.

In the same manner as in the seventh example, furthermore, the cable communication line 27 may be disposed from the controller 2 to the vicinity of the robot 1 and the antenna 24 and the second communication failure frequency monitoring portion may be disposed on a tip thereof.

It is also possible to monitor the field intensity and the communication failure frequency at the same time by using the first communication failure frequency monitoring portion 14 and the first field intensity monitoring portion 13 together. Similarly, it is also possible to monitor the second communication failure frequency monitoring portion 28 and the second field intensity monitoring portion 26 at the same time.

According to the method, by monitoring the communication failure frequency of the communication data of the wireless communication 4 through the portable teaching operation unit 3 and the controller 2 respectively, it is possible to give the alarm when the frequency at which the communication failure is generated is equal to or greater than the third threshold D which is preset and to stop the driving operation of the mechanism unit when the same frequency is equal to or greater than the fourth threshold E which is preset. Also in the wireless communication environment in which a communicating state is poor, therefore, the operator can grasp the communication failure frequency thereof. Even if a fatal communication failure is generated, it is possible to enhance the safety of the automatic machine.

Industrial Applicability

The invention can prevent an operator from operating a robot without an awareness at an outside of an operable range by monitoring a field intensity of communication data of a wireless communication or a communication failure frequency in a portable teaching operation unit caused to be wireless in an industrial robot which is used for welding, painting and assembly.

The invention claimed is:

1. An automatic machine system comprising: a mechanism unit including at least one driving mechanism; a controller for controlling a driving operation of the mechanism unit; and a teaching unit for operating the mechanism unit, wherein the teaching unit includes: a teaching unit communicating portion for carrying out a wireless communication with the controller; and a first field intensity monitoring portion for monitoring a field intensity of communication data in the teaching unit communicating portion, and the controller includes: a controller communicating portion for carrying out a wireless communication with the teaching unit; a second field intensity monitoring portion for monitoring the field intensity of communication data in the controller communicating portion; and a driving portion for driving the mechanism unit based on an operation signal sent from the teaching unit, which is received in the controller communicating portion wherein the first or second field intensity monitoring portion gives an alarm to an operator when the field intensity is equal to or smaller than a first threshold which is preset, and stops the driving operation of the mechanism unit when the field intensity is equal to or smaller than a second threshold which is preset wherein the first or second field intensity monitoring portion releases a radio channel used in the wireless communication when the driving operation of the mechanism unit is stopped.

2. The automatic machine system according to claim 1, wherein the first or second field intensity monitoring portion monitors the field intensity every certain cycle, and gives the alarm to the operator when the field intensity is equal to or smaller than a preset third threshold continuously at a preset number of times.

3. The automatic machine system according to claim 2, wherein the first or second field intensity monitoring portion holds the preset number of times as a parameter.

4. The automatic machine system according to claim 1, wherein the first or second field intensity monitoring portion holds the preset thresholds of the field intensity as parameters.

5. The automatic machine system according to claim 1, wherein the alarm generated by the first field intensity monitoring portion is a display, a sound or a vibration, or a combination thereof.

6. The automatic machine system according to claim 1, wherein the alarm generated by the second field intensity monitoring portion is a display, a sound or an output to an external apparatus connected to the controller, or a combination thereof.

7. The automatic machine system according to claim 1, wherein the first field intensity monitoring portion generates a display, a sound or a vibration as the alarm, and the second field intensity monitoring portion generates a display, a sound or an output to an external apparatus as the alarm when the driving operation of the mechanism unit is stopped.

8. The automatic machine system according to claim 1, wherein the second field intensity monitoring portion is disposed in the vicinity of an antenna of the controller communicating portion.

9. An automatic machine system comprising: a mechanism unit including at least one driving mechanism; a controller for controlling a driving operation of the mechanism unit; and a teaching unit for operating the mechanism unit, wherein the teaching unit includes: a teaching unit communicating portion for carrying out a wireless communication with the controller; and a first communication failure frequency monitoring portion for monitoring a communication failure frequency of the wireless communication in the teaching unit communicating portion, and the controller includes: a controller communicating portion for carrying out a wireless communication with the teaching unit; a second communication failure frequency monitoring portion for monitoring the communication failure frequency of the wireless communication in the controller communicating portion; and a driving portion for driving the mechanism unit based on an operation signal sent from the teaching unit which is received in the controller communicating portion wherein the first or second field intensity monitoring portion gives an alarm to an operator when the field intensity is equal to or smaller than a first threshold which is preset, and stops the driving operation of the mechanism unit when the field intensity is equal to or smaller than a second threshold which is preset wherein the first or second field intensity monitoring portion releases a radio channel used in the wireless communication when the driving operation of the mechanism unit is stopped.

10. The automatic machine system according to claim 9, wherein the first or second communication failure frequency monitoring portion monitors the communication failure frequency every certain cycle, and gives the alarm to the operator when the communication failure frequency is equal to or greater than a preset third threshold continuously at a preset number of times.

11. The automatic machine system according to claim 10, wherein the first or second communication failure frequency monitoring portion holds the preset number of times as a parameter.

12. The automatic machine system according to claim 9, wherein the first or second communication failure frequency monitoring portion holds the preset thresholds of the communication failure frequency as parameters.

13. The automatic machine system according to claim 9, wherein the alarm generated by the first communication failure frequency monitoring portion is a display, a sound or a vibration, or a combination thereof.

14. The automatic machine system according to claim 9, wherein the alarm generated by the second communication failure frequency monitoring portion is a display, a sound or an output to an external apparatus connected to the controller, or a combination thereof.

15. The automatic machine system according to claim 9, wherein the first communication failure frequency monitoring portion generates a display, a sound or a vibration as the alarm, and the second communication failure frequency monitoring portion generates a display, a sound or an output to an external apparatus as the alarm when the driving operation of the mechanism unit is stopped.

16. The automatic machine system according to claim 9, wherein the second communication failure frequency monitoring portion is disposed in the vicinity of an antenna of the controller communicating portion.

17. A wireless communication method of an automatic machine system comprising a controller for controlling a driving operation of a mechanism unit including at least one driving mechanism, and a teaching unit for operating the mechanism unit, the method comprising:

the teaching unit carrying out a wireless communication with the controller to monitor a field intensity of communication data, the controller carrying out a wireless communication with the teaching unit to monitor the field intensity of communication data, giving an alarm when the field intensity is equal to or smaller than a first threshold which is preset and stopping the driving operation of the mechanism unit when the field intensity is equal to or smaller than a second threshold which is preset wherein a radio channel used in the wireless communication is released when the driving operation of the mechanism unit is stopped.

18. A wireless communication method of an automatic machine system comprising a controller for controlling a driving operation of a mechanism unit including at least one driving mechanism, and a teaching unit for operating the mechanism unit, the method comprising:

the teaching unit carrying out a wireless communication with the controller to monitor a generation frequency of communication failure of communication data, the controller carrying out a wireless communication with the teaching unit to monitor the generation frequency of communication failure of communication data, giving an alarm when the generation frequency of communication failure is equal to or greater than first threshold which is preset and stopping the driving operation of the mechanism unit when the generation frequency of communication failure is equal to or greater than second threshold which is preset wherein a radio channel used in the wireless communication is released when the driving operation of the mechanism unit is stopped.

* * * * *